United States Patent [19]

Tobey

[11] Patent Number: 5,098,180
[45] Date of Patent: Mar. 24, 1992

[54] SEPARABLE INTERCHANGEABLE EYEGLASS FRAMES

[76] Inventor: Michael D. Tobey, 1885 N.E. Yellowstone Lane, Bend, Oreg. 97702

[21] Appl. No.: 526,101

[22] Filed: May 18, 1990

[51] Int. Cl.$^5$ .............................................. G02C 1/08
[52] U.S. Cl. ...................................... 351/97; 351/92; 351/85
[58] Field of Search ....................... 351/85, 92, 97, 98, 351/101, 154

[56] References Cited

U.S. PATENT DOCUMENTS

| | | | |
|---|---|---|---|
| D. 293,450 | 12/1987 | Jannard . | |
| 1,235,842 | 8/1917 | Reagan | 351/92 |
| 2,155,693 | 4/1939 | Tanasso et al. | 351/85 |
| 2,594,395 | 4/1952 | Castelli | 351/92 |
| 3,826,564 | 7/1974 | Werling, Sr. | 351/154 |
| 4,674,851 | 6/1987 | Jannard . | |
| 4,730,915 | 3/1988 | Jannard . | |
| 4,813,775 | 3/1989 | Kaksonen | 351/92 |

*Primary Examiner*—Rodney B. Bovernick
*Assistant Examiner*—J. P. Ryan
*Attorney, Agent, or Firm*—Klarquist, Sparkman, Campbell, Leigh & Whinston

[57] ABSTRACT

A separable interchangeable eyeglass frame includes an upper frame member having a brow member including first and second upper eye wire members interconnected by a bridge member. The upper frame member has first and second elongated temple members pivotally joined to the outboard ends of the first and second upper eye wire members. The eyeglass frame includes a lower frame assembly having first and second lower eye wire members. The lower frame assembly may include first and second filament members for attaching first and second lenses to respective first and second lower eye wire members, thereby forming a lower lens assembly. The lower frame assembly may be comprised of two separate pieces, or may be a unitary member with the first and second lower eye wire members interconnected by a lower bridge member. A variety of securing fasteners may be used to releasably secure together the upper frame member and the lower frame assembly. In this manner, the upper frame member may be detached from the lower frame assembly and interchanged with other similar upper frame members allowing a user of the eyeglass assembly to vary the style and color of eyeglass frame to be worn.

22 Claims, 4 Drawing Sheets

SEPARABLE INTERCHANGEABLE EYEGLASS FRAMES

BACKGROUND OF THE INVENTION

The present invention relates generally to an eyeglass assembly and eyeglass frames, and more particularly to an improved separable interchangeable eyeglass frame, having a lower frame assembly for holding an eyeglass lens and a detachable upper frame member which may be interchanged with other detachable upper frame members which may be of different colors and styles.

For years, people having vision which needed correction were restricted to correcting that vision with prescription spectacles or eyeglasses. The cost of prescription eyeglasses has restricted most people from having more than one pair until a new prescription was required. The face of this person having poor vision seemed destined to be hidden behind a single pair of glasses for one or two years, or even longer.

The advent of contact lenses, and particularly the soft contact lenses and the water permeable extended wear contact lenses, seemed to be a viable alternative for these people. However, recent studies suggest that wearing contact lenses may be damaging to one's eyes. Furthermore, for those people needing correction of both near and far vision, contact lenses cannot substitute for the traditional bifocal and trifocal eyeglasses.

Thus, there has been a trend back toward the wearing of eyeglasses. However, all of the old problems still remain. For example, eyeglass frames are susceptible to damage and breakage, particularly at the bridge or nosepiece, at the hinge, and at the temple pieces. Even with today's "Eyeglasses In One Hour" optometrist services, one still has the inconvenience of travel to the optometrist's place of business and the one hour wait.

Furthermore, during the first month or two after a new prescription is introduced, one's eyes go through a process of visual training. During visual training, the eyes adjust to the new prescription. During this period of visual training, the lenses are often changed, requiring that a whole new set of frames be made to accommodate the new lenses.

Other interchangeable frame members have been used with skiing glasses having a single, thin tinted plastic lens. The lens of the ski glasses has a substantially straight upper edge and an opposing lower edge having a nose-receiving recess. The ski glasses have an elongated frame having a lens-receiving slot and two temple pieces pivotally attached to each end of the elongated frame. The ski glasses also include a nose pad piece having a slot for receiving the nose recess of the lens. The single lens is retained within the nosepiece and frame slots by friction.

The nose pad piece, frame and temple members of the ski glasses may be of different colors. These different colored pieces may be assembled together by a skier to form ski glasses which coordinate with the skier's clothes. One such brand of ski glasses is sold under the tradename OAKLEY'S BLADES TM. Another brand of ski glasses having a removable nose piece is sold under the trademark LEISURE TIME ®, and the other being sold under the tradename OAKLEY'S BLADES TM.

These ski glasses are not capable of receiving two separate lenses, such as prescription lenses having different optic properties to correct variations in the eyesight of each of a wearer's eyes. Furthermore, these known ski glasses are susceptible to accidental disassembly, such as during a skier's fall on the ski slopes.

Thus, a need exists for an improved eyeglass assembly and eyeglass frame which is not susceptible to the above limitations and disadvantages.

SUMMARY OF THE INVENTION

It is an overall object of the present invention to provide an improved eyeglass frame for seating at least one lens to form an improved eyeglass assembly.

A further object of the present invention is to provide an improved eyeglass frame with interchangeable components to provide a wearer with a selection in the fashion, style and color of eyeglass frames.

An additional object of the present invention is to provide an eyeglass frame assembly with parts which may be interchanged by a user in the event of breakage, without requiring a trip to the optometrist.

Still another object of the present invention is to provide an eyeglass assembly having interchangeable lenses which may be rapidly interchanged by a user, for example, to switch from regular lenses for indoor use to tinted lenses for outdoor use.

Yet another object of the present invention is to provide an eyeglass frame which may be interchanged with like frame components by a user so the user feels that his or her best appearance is being presented.

According to one aspect of the present invention, an eyeglass frame for seating a lens having a periphery with upper and lower portions. The eyeglass frame includes an upper frame member having upper seating means for seating the upper portion of the lens periphery, and a lower frame assembly having lower seating means for seating the lower portion of the lens periphery. The eyeglass frame also includes securing means for releasably securing together the upper frame member and the lower frame assembly. In this manner, the lens may be seated in the upper and lower seating means between the upper frame member and the lower frame assembly.

According to another aspect of the present invention, an eyeglass assembly is provided having an upper frame member and a lower lens assembly. The lower lens assembly includes a first lower eye wire member, a first lens, and first attachment means for attaching the first lens to the first lower eye wire member. The eyeglass assembly also includes securing means for releasably securing together the upper frame member and the lower lens assembly with the first lens seated therebetween. The upper frame member may be detached from the lower lens assembly by a user of the eyeglass assembly releasing the securing means.

According to a further aspect of the present invention, an eyeglass upper frame member is provided for receiving a lens retaining assembly for seating and attaching thereto at least one lens having a periphery with upper and lower portions. This lens retaining assembly also has interframe securing means and a first lower eye wire member with lower seating means for seating the lower portion of the lens periphery. The eyeglass upper frame member includes a brow member having opposing first and second ends and a first upper eye wire member located between the first and second ends. The first upper eye wire member has upper seating means for seating the upper portion of the lens periphery. The eyeglass upper frame member also includes first and second elongated temple members each having a proximate end. Each temple member also has a distal end which terminates in an earpiece. The first temple member proximate end is pivotally connected to the first end of the brow member, and the second temple member proximate end is pivotally connected to the second end of the brown member. The eyeglass upper frame member also includes receiving means for releasably receiving the interframe securing means of the lens retaining assembly. In this manner, the upper frame member may be detached from the lens retaining assembly by a user releasing the interframe securing means.

In an illustrated embodiment, the lower frame assembly may be a single piece having two lower eye wire members, each receiving a lens, and being interconnected by a bridge member. In another embodiment, the lower frame assembly may include separate first and second lower eye wire members, each independently attachable to the upper frame member.

These and other objects, features and advantages of the present invention will become apparent to those skilled in the art from the following description and drawings.

DETAILED DESCRIPTION OF A PREFERRED EMBODIMENT

Figure 1:
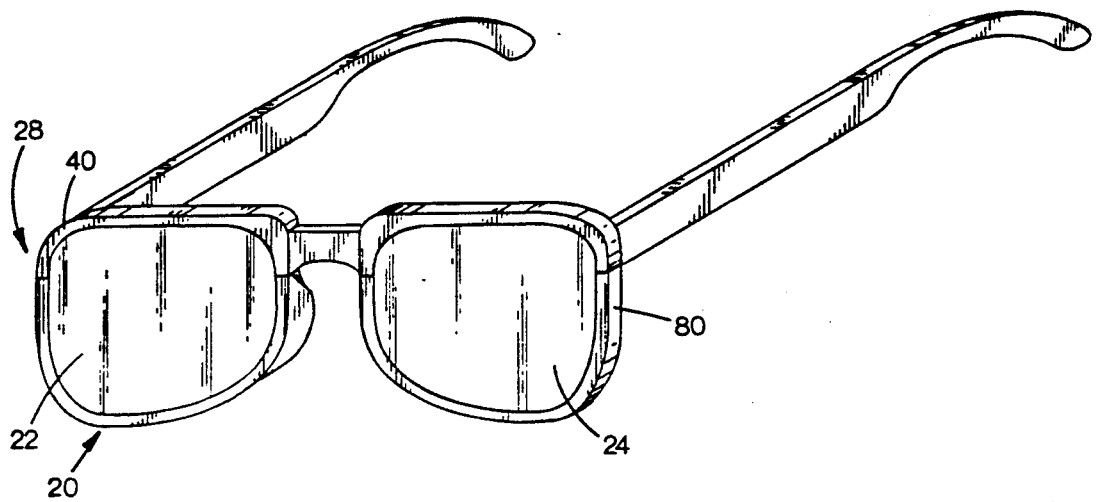
FIG. 1 is a perspective view of one form of an eyeglass assembly of the present invention.
Figure 2:
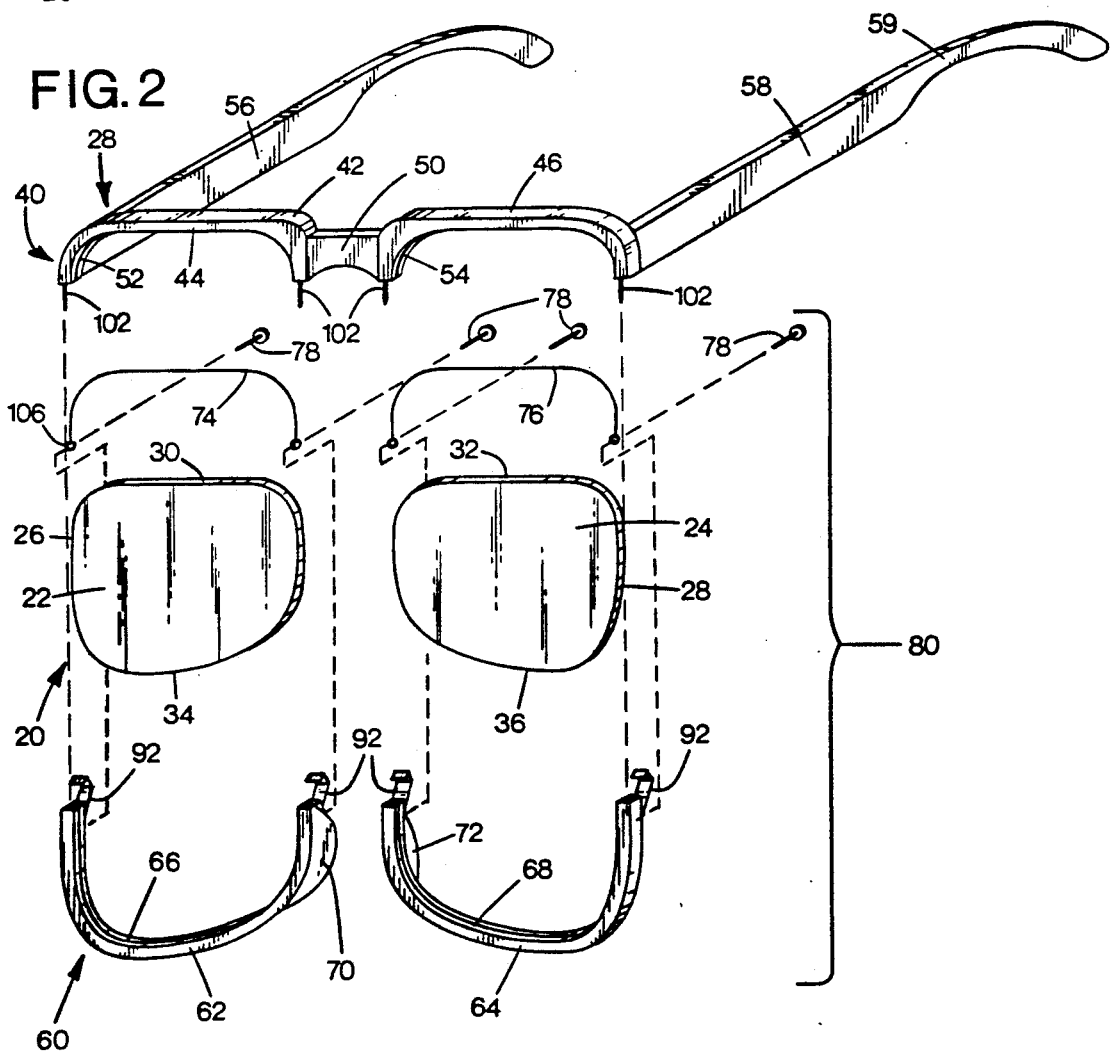
FIG. 2 is an exploded perspective view of the eyeglass assembly of FIG. 1.

FIGS. 1 and 2 illustrate one embodiment of an eyeglass assembly 20 having a lens, such as first and second lenses 22 and 24. The lenses 22 and 24 may be of plastic or glass, tinted or clear, prescription or nonprescription, or the like. The first and second lenses 22 and 24 each have a periphery 26 and 28, respectively. The first and second lens peripheries 26 and 28 may be divided into respective upper portions 30, 32 and respective lower portions 34, 36.

The eyeglass assembly 20 also includes a separable interchangeable eyeglass frame 28 including an upper frame member 40. The upper frame 40 includes a brow member 42 having first and second upper frame or eye wire members 44 and 46. The first and second eye wire members 44 and 46 are joined together at their inboard ends by a nose piece or bridge member 50. The upper eye wire members 44 and 46 each have upper seating means, such as respective recessed grooves 52 and 54, for seating the first and second lens periphery upper portions 30 and 32.

The upper frame member 40 also includes first and second elongated temple members 56 and 58. The first temple member 56 is pivotally attached to the brow member 42 at the outboard end of the first upper eye wire member 44, and the second temple member 58 is pivotally attached to the outboard end of the second upper eye wire member 46. The pivotal attachment of the temple members 56 and 58 to the brow member 42 may be by a conventional hinge or by other hinge means, such as a detachable pivot. Furthermore, the temple members 56 and 58 may be rigidly interconnected with the brow member 42 if desired. Each of the illustrated temple members 56 and 58 includes a bend or ear piece, such as 59, at the end distal from the brow member 42.

The eyeglass frame 28 also includes lens retaining means, such as lens retaining lower frame assembly 60 for retaining lenses 22 and 24. The lower frame assembly 60 includes first and second lower eye wire or lower frame members 62 and 64. The lower frame assembly 60 includes lower seating means comprising the first lower eye wire member 62 having first seating means, such as a recessed groove 66 for receiving the lower portion 34 of the periphery of lens 22. The lower seating means also includes the second lower eye wire member 64 having second seating means, such as a recessed groove 68 for seating the lower portion 36 of the periphery of lens 24. The lower eye wire member 62 may also include a first nose pad 70, and the other lower eye wire member 64 may include a second nose pad 72.

The lower frame assembly 60 may include attachment means, such as first and second fish wire or fish line filaments 74 and 76 and plural attachment pins or screws, such as pin 78. In this manner, filament 78 may be used to attach lens 22 to the lower eye wire member 62 which has holes therein for receiving pins 78. Similarly, lens 24 may be attached to the lower eye wire member 64 using filament 76. In this manner, a lower lens assembly 80 may be formed which includes the first and second lenses 22 and 24 attached to the first and second lower eye wire members 62 and 64.

Figure 3:
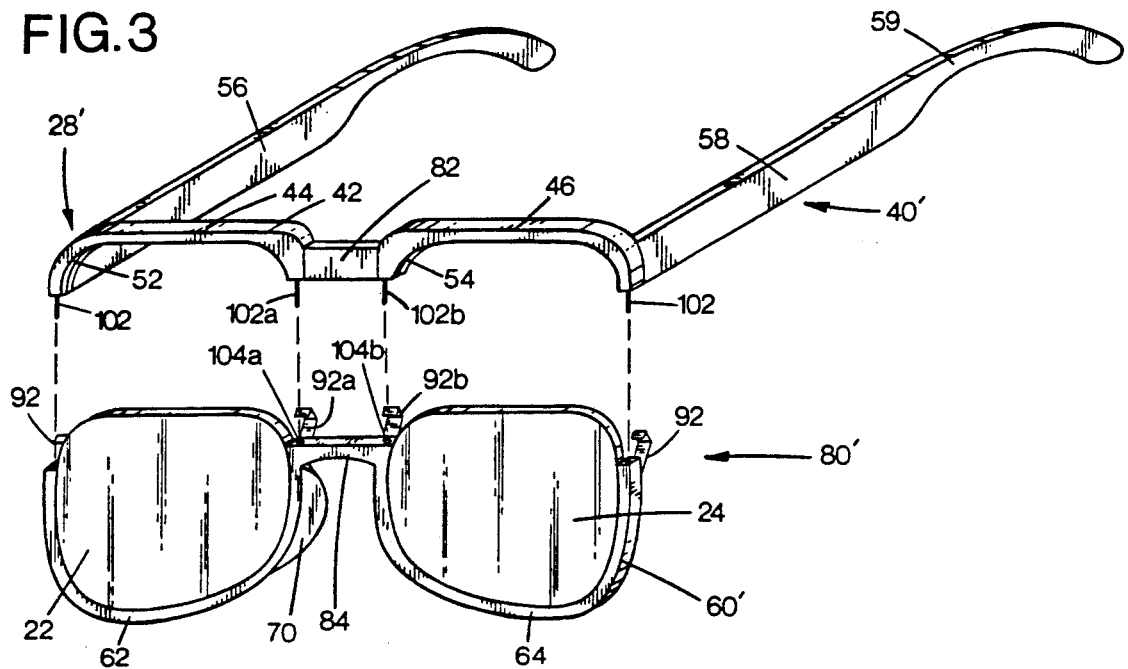
FIG. 3 is a partially exploded perspective view of one form of an alternate embodiment of the eyeglass assembly of the present invention.

Referring to FIG. 3, an alternate eyeglass assembly 28' is shown having an alternative lower lens assembly 80' with an alternate single-piece or unitary lower frame assembly 60'. The upper frame member 40' includes first and second upper eye wire members 44 and 46 interconnected by an upper bridge member 82. The unitary lower frame assembly 60' includes first and second lower eye wire members 62 and 64 which are interconnected by a lower nose piece or bridge member 84. Attachment means include the first and second lower eye wire members 62 and 64 encompassing a large enough portion of the first and second lens peripheries 26 and 28 to attach lenses 22 and 24 to the lower frame assembly 60'. Alternatively, the unitary lower frame assembly 60' may include filament attachment means, such as shown in FIG. 2.

Figure 4:
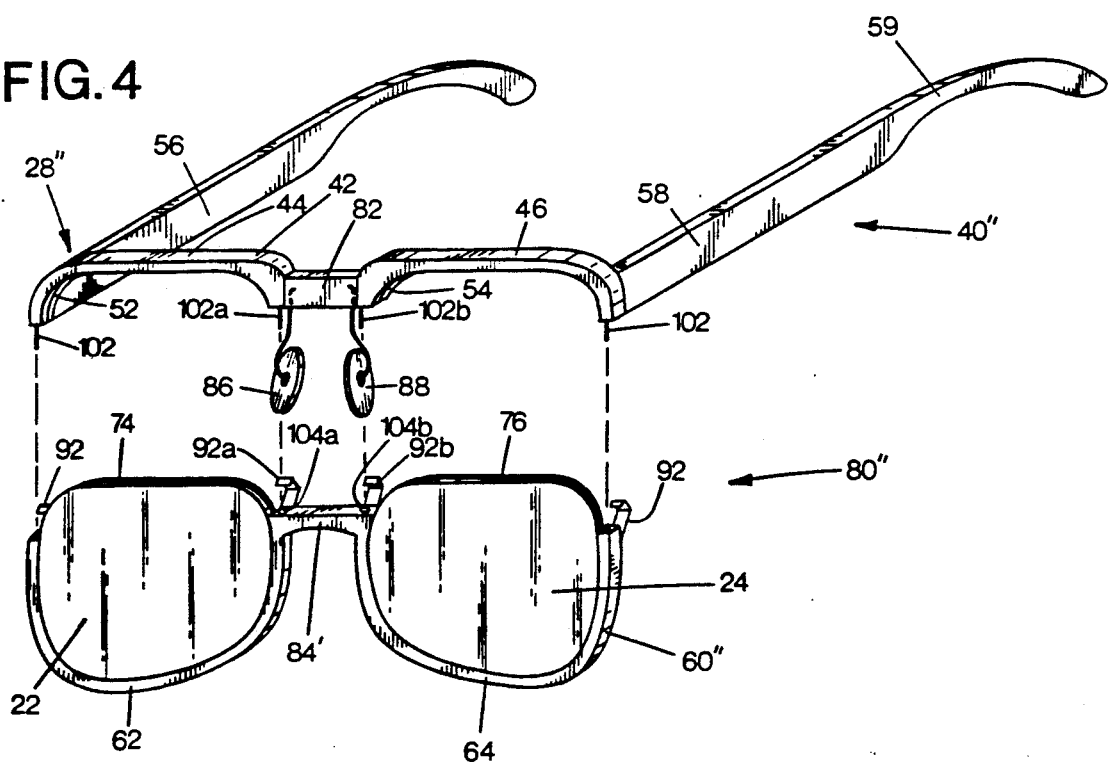
FIG. 4 is a partially exploded perspective view of one form of another alternate embodiment of the eyeglass assembly of the present invention.

FIG. 4 illustrates an alternative eyeglass assembly 28" having lower lens assembly 80" and upper frame 40" with an upper bridge member 82. The upper frame 40" includes an alternative nose pad attachment scheme having first and second nose pad assemblies 86 and 88 distending downwardly from the upper bridge member 82. The lower lens assembly 80" includes lower frame assembly 60" with lower eye wire members 62 and 64 provided without nose pads. The lower eye wire members 62 and 64 are interconnected by a lower bridge member 84'. Lenses 22 and 24 are attached to respective lower eye wire members 62 and 64 by respective filaments 74, 76 and pins 78.

Figure 5:
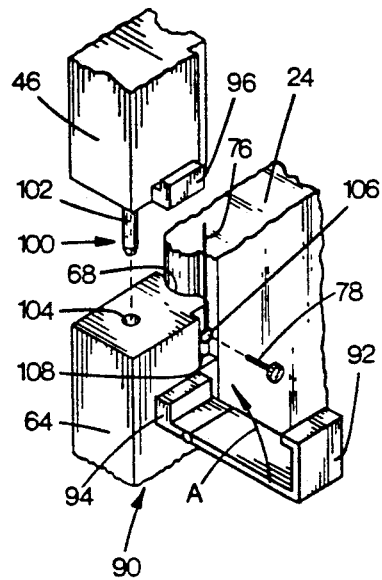
FIGS. 5, 7 and 10 are enlarged perspective partial views of alternate embodiments of the securing means of the eyeglass assembly of FIGS. 1 and 2, and which may also form a portion of the securing means of the eyeglass assemblies shown in FIGS. 3 and 4.

The eyeglass frame 28 of FIGS. 1 and 2 also includes interframe securing means, such as latching securing means 90 shown in FIG. 5, for releasably securing together the upper frame member 40 and the lower frame assembly 60. The securing means 90 includes a latch 92 pivotally attached to a lower eye wire member, such as 64, by hinge member 94. The securing means 90 also includes the mating associated end of an upper eye wire member, such as 46, having a latch receiving means, such as lip 96.

The eyeglass frame 28 also includes alignment means 100 for aligning the upper frame member 40 and the lower frame assembly 60. In the embodiment of FIG. 5, the alignment means 100 includes at an end of an upper eye wire member, such as 46, having an alignment pin 102 projecting downwardly therefrom. The alignment means 100 also includes the end of a lower eye wire member, such as 64, having a hole 104 sized to receive the alignment pin 102.

FIG. 5 also illustrates the filament attachment means for lens assembly 80 or 80" using filament 76 having an eye 106 formed in the end thereof for receiving pin 78. The lower eye wire member 64 includes a filament receiving recess 108 having a hole (not shown) extending inwardly into member 64 for receiving pin 78.

In operation, with a lens, such as 24, attached to the lower eye wire member 64 the upper frame and lower frame assembly may be aligned using pins 102 received by holes 104. The upper frame member and lower frame assembly may then be releasably secured together with the lens seated in between by pivoting latch 92 upward in the direction indicated by arrow A to engage the latch receiving lip 96. Latch 92 may be open in a direction opposite arrow A to separate the upper frame member 40 from the lower frame assembly 60 as desired.

Figure 6:
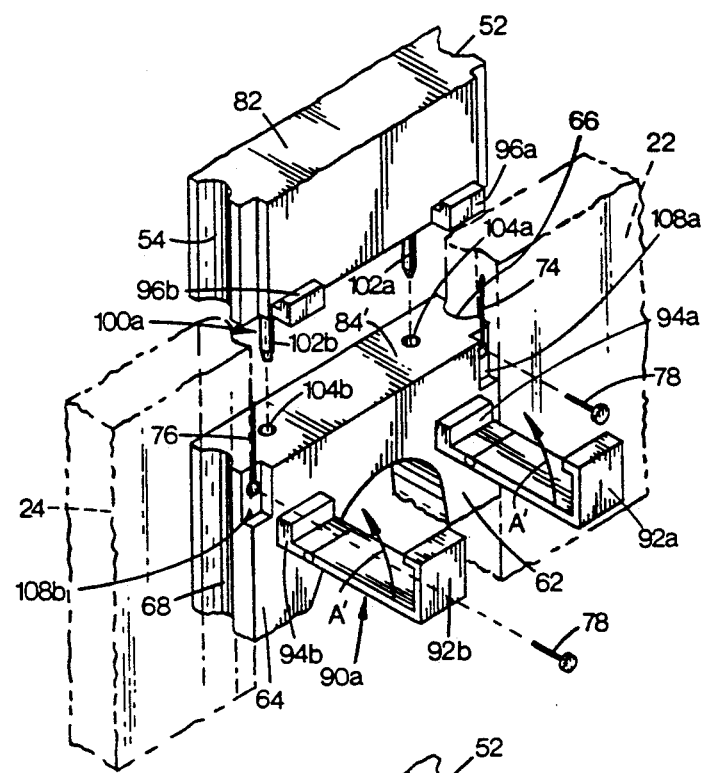
FIGS. 6, 8 and 11 are enlarged exploded perspective partial views of alternate embodiments of a portion of the securing means of FIGS. 3 and 4.

FIG. 6 illustrates another portion of the interframe securing means, specifically, bridge securing means 90a and bridge alignment means 100a. The bridge securing means 90a and bridge alignment means 100a may be used in conjunction with securing means 90 and alignment means 100 of FIG. 5 for eyeglass frames 28' and 28" illustrated in FIGS. 3 and 4. The lower bridge member 84' of FIG. 4 is illustrated, including filament receiving recesses 108a and 108b. The lower bridge member 84 of FIG. 3 would not include the filament receiving recesses 108a and 108b.

The bridge securing means 90a includes the lower bridge member 84' having first and second latches 92a and 92b pivotally attached thereto by respective hinge members 94a and 94b. The bridge securing means 90a includes the upper bridge member 82 having first and second latch receiving lips 96a and 96b.

The bridge alignment means 100a includes the upper bridge member 82 having first and second alignment pins 102a and 102b projecting downwardly therefrom. The lower bridge member 84' includes first and second alignment holes 104a and 104b for receiving respective alignment pins 102a and 102b. When the bridge alignment means 100a are engaged, latches 92a and 92b may be pivoted upwardly as indicated by arrows A' to engage the respective latch receiving lips 96a and 96b.

Figure 7:
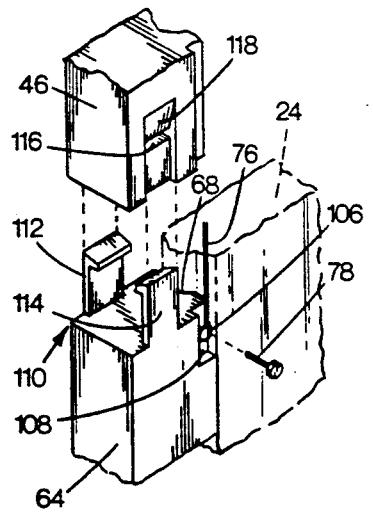

FIG. 7 illustrates an alternate snap hook securing means 110 which may be used instead of the securing means 90 having latches 92, and instead of the alignment means 100 having pins 102 as shown in the embodiments of FIGS. 2, 3 and 4. The snap hook securing means 110 includes a lower eye wire member, such as 64, having a pair of opposing snap hooks 112 and 114. An upper eye wire member, such as 46, includes two opposing snap hook receiving recesses, such as 116. Adjacent the snap hook receiving recesses, such as 116, the upper eye wire member 46 has a snap hook releasing recess 118, disposed upwardly above the snap hook receiving recess 116.

In operation, the upper frame member 40", for example, is releasably secured to the lower frame assembly 60" by pushing together the member 40" and assembly 60" and spreading apart the opposing snap hooks 112 and 114 until they engage the opposing snap hook receiving recesses, such as 116. The snap hook securing means 110 may be disengaged by spreading apart the snap hooks 112 and 114 using the snap hook releasing recesses, such as 118, to access the snap hooks with, for example, one's fingernail. With the snap hooks 112 and 114 spread apart, the upper frame member 40" and the lower frame assembly 60" may be pulled apart to disassemble eyeglass frame 28".

The illustrated snap hook securing means 110 includes alignment means, formed by sizing the width of the snap hook receiving recess, such as 116, to be just slightly larger than the width of the snap hook. Furthermore, by making the depth of the snap hook receiving recess 116 approximately equal to the thickness of the snap hook, a smooth outer surface is provided upon assembly. With this depth of recess 116, the snap hooks are only under tension during assembly or disassembly, and in a relaxed state when assembled.

Figure 8:
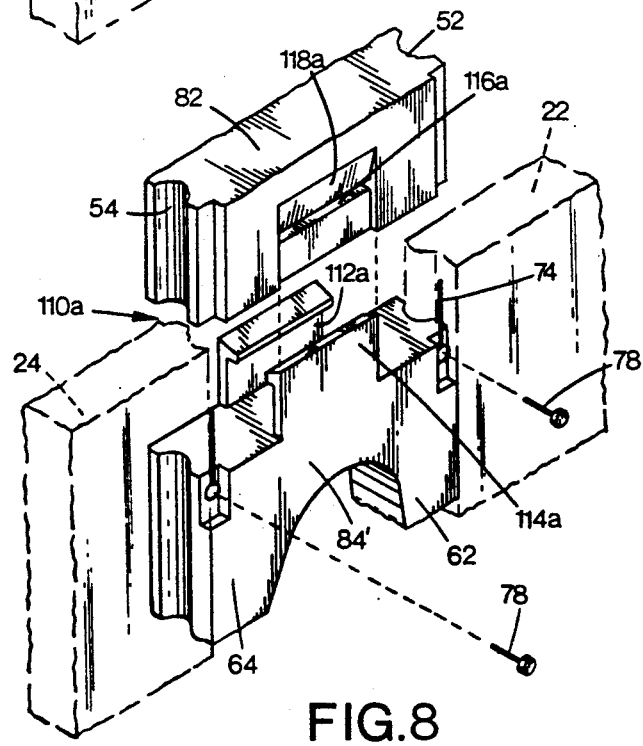

FIG. 8 illustrates snap hook bridge securing means 110a, which is an alternate embodiment of that shown in FIG. 6 and which may be used with eyeglass frames 28' and 28", shown in FIGS. 3 and 4. The snap hook bridge securing means 110a includes the lower bridge member 84' having opposing first and second snap hooks 112a and 114a. The upper bridge member 82 includes opposing first and second snap hook receiving recesses, such as 116a, and first and second opposing snap hook release recesses, such as 118a. The alignment means, as well as the means of insertion for assembly and disassembly, of the bridge securing means 110a is as described for the securing means 110 of FIG. 7.

Figure 9:
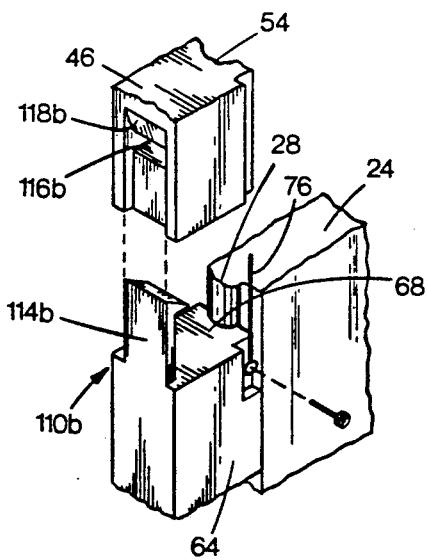
FIG. 9 is an enlarged exploded perspective partial view of one form of an alternate embodiment of the securing means of FIGS. 5, 7 and 10 which may form a portion of the securing means of the eyeglass assemblies shown in FIGS. 3 and 4.

FIG. 9 illustrates an alternate single snap hook securing means 110b, which may be used in place of that shown in FIG. 7 for the eyeglass frames 28' and 28" of FIGS. 3 and 4. The single snap hook securing means 110b includes the outboard end of a lower eye wire member, such as 64, having a single snap hook 114b projecting upwardly therefrom, opposite the lower lens seating means 68. The single snap hook securing means 110b also includes the upper eye wire member 46 having a snap hook receiving recess 116b and a snap hook releasing recess 118b. The sizing of the components of the single hook securing means 110b, as well as the method of assembly and disassembly, is as described for the securing means 110 of FIG. 7.

Figure 10:
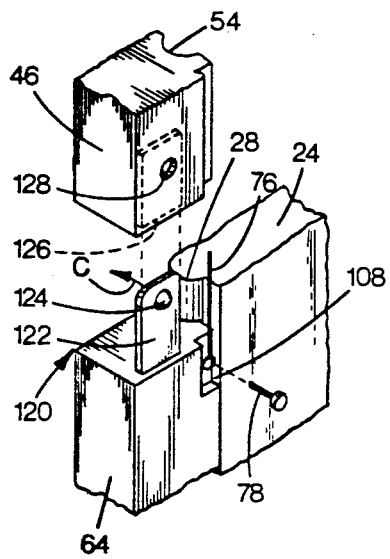

FIG. 10 illustrates an alternate spring tab securing means 120 which may be used in place of the securing means shown in FIGS. 5 and 7. The spring tab securing means 120 includes a lower eye wire member, such as 64, having a spring tab 122 projecting upwardly therefrom. The spring tab 122 includes a projection, such as button 124. The spring tab securing means 120 also includes an upper eye wire member, such as 46, having a tab receiving recess or slot 126 extending upwardly therethrough. Tab receiving recess 126 and tab 122 may be sized in width to provide alignment means for the eyeglass frame. Furthermore, tab receiving recess 126 is sized in thickness to receive the thickness of tab 122 and button 124. The upper frame member also includes a hole 128 extending from the outer surface of an upper eye wire member, such as 46, through to the tab receiving recess 126.

In operation, when the upper frame member 40", for example, and the lower frame assembly 60" are drawn together with the upper seating means, such as 54 engaging the lens periphery, such as 28, the spring tab 122 pivots backwards slightly in the direction indicated by arrow C. This springing of tab 122 allows button 124 to ride upward through slot 126, and then to engage hole 128 to secure together the upper frame member 40" and the lower frame assembly 60". The spring tab securing means 120 may be disassembled by pushing button 124 inward while pulling the upper frame member 40" the lower frame assembly 60" slightly apart so button 124 disengages hole 128.

Figure 11:
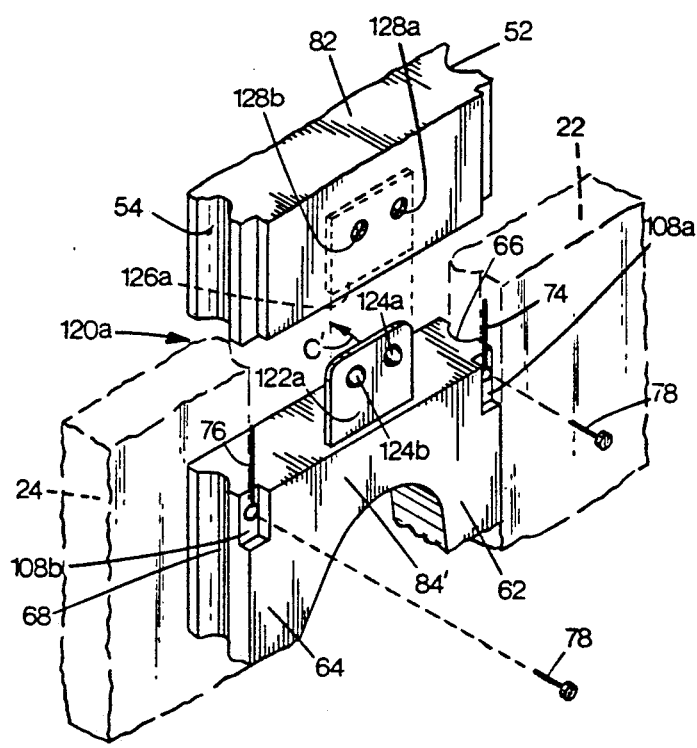

FIG. 11 illustrates bridge spring tab securing means 120a which may be substituted for the embodiments of FIGS. 6 and 8. The bridge spring tab securing means 120a includes the lower bridge member 84' having at least one spring tab 122a projecting upwardly therefrom. Spring tab 122a includes two spring tab securing projections, such as buttons 124a and 124b. The bridge spring tab securing means 120a also includes the upper bridge member 82 having a tab receiving recess or slot 126a extending upwardly therethrough. The upper bridge member 82 also includes two holes 128a and 128b extending from the outer surface through to tab receiving recess 126a. The manner of assembly and disassembling the bridge spring tab securing means 120a, as well as sizing the alignment means, is as described for assembling and disassembling spring tab securing means 120 of FIG. 10.

The means for manufacturing the illustrated securing means of FIGS. 5 through 11 are known and may be implemented by those in the injection molded plastics art. The means of attaching the lenses to the lower eye wire members are known to those in the optometric art.

The separable interchangeable eyeglass frames described above are particularly advantageous for a person requiring prescription lenses. The prescription lens wearer may purchase a single pair of lenses 22 and 24 attached to the lower frame assembly, such as 60, to form a lower lens assembly 80. The wearer may then purchase a variety of upper frame members, such as 40, respectively, which may be interchanged with the respective lower lens assemblies 60. In this manner, a wearer may vary the style and color of eyeglass frames to provide, for example, fashion or color coordination with one's clothing. Thus, people who must wear prescription eyeglasses now have a variety of selections without the expense of purchasing additional pairs of eyeglasses.

Such interchangeability by a user is also particularly advantageous since it is the upper frame members, such as the bridge piece and temples pieces, which are typically broken. The separable interchangeable eyeglass frame assembly of the present invention would allow the user to interchange the broken upper frame member with a different one to repair the eyeglass assembly without requiring a trip to the optometrist.

Having illustrated and described the principles of my invention with respect to several preferred embodiments, it should be apparent to those skilled in the art that my invention may be modified in arrangement and detail without departing from such principles. For example, other securing means may be employed to interconnect the upper frame member, such as 40, with the lower frame assembly 60. Furthermore, other attachment means may be used to attach the lenses to the lower frame assembly 60, or those illustrated may be reversed. For example, latch 92 and latch receiving recess 116 may interchanged. Furthermore, the principals of this invention could be applied to a single lens, such as one wide enough to cover both eyes. I claim all such modifications falling within the scope and spirit of the following claims.

I claim:

1. An eyeglass frame for seating a lens having a periphery with upper and lower portions, the eyeglass frame comprising:
   an upper frame member having upper seating means for seating the upper portion of the lens periphery;
   a lower frame assembly having lower seating means for seating the lower portion of the lens periphery; and
   securing means extending from one of the upper frame member and lower frame assembly;
   wherein the other of the upper frame member and lower frame assembly has receiving means for receiving the securing means, with the securing means configured to engage the receiving means so as to releasably secure together the upper frame member and the lower frame assembly, whereby the lens may be seated in the upper and lower seating means between the upper frame member and the lower frame assembly.

2. An eyeglass frame according to claim 1 wherein the lower frame assembly includes attachment means for attaching the lens thereto.

3. An eyeglass frame according to claim 1 further including alignment means for aligning the upper frame member with the lower frame assembly.

4. An eyeglass frame according to claim 1 for seating first and second lenses, wherein:
   the lower frame assembly further includes first and second lower eye wire members, and first attachment means for attaching the first lens to the first lower eye wire member, and second attachment means for attaching the second lens to the second lower eye wire member; and
   the lower seating means comprises the first lower eye wire member having first lower seating means for seating the first lens and the second lower eye wire member having second lower seating means for seating the second lens.

5. An eyeglass frame according to claim 1 for seating first and second lenses, wherein:
   the lower frame assembly includes first and second lower eye wire members and a bridge member interconnecting first and second lower eye wire members; and
   the lower seating means comprises the first lower eye wire member having first lower seating means for seating and attaching the first lens thereto, and the second lower eye wire member having second lower seating means for seating and attaching the second lens thereto.

6. An eyeglass frame according to claim 1 wherein:

the securing means comprises latch means pivotally connected to said one of the upper frame member and the lower frame assembly; and the receiving means comprises latch receiving means for receiving the latch means;

wherein the latch means is pivotally engagable with the latch receiving means for latching together the upper frame member with the lower frame assembly.

7. An eyeglass frame according to claim 1 wherein:
the securing means comprises snap hook means; and
the receiving means comprises snap hook receiving means for receiving the snap hook means;
wherein the snap hook means is flexibly engagable with the snap hook receiving means for snapping together the upper frame member with the lower frame assembly.

8. An eyeglass frame according to claim 1 wherein:
the securing means comprises flexible tab means; and
the receiving means comprises flexible tab receiving means for receiving the flexible tab means;
wherein the flexible tab means is flexible engagable with the flexible tab receiving means for snapping together the upper frame member with the lower frame assembly.

9. An eyeglass frame according to claim 1 wherein the lower frame assembly includes at least one nose pad for resting the eyeglass frame on the nose of a wearer.

10. An eyeglass frame according to claim 1 wherein the upper frame member includes two nose pads for resting the eyeglass frame on the nose of a wearer.

11. An eyeglass assembly, comprising:
an upper frame member;
a lower lens assembly including a first lower eye wire member, a first lens, and attachment means for attaching the first lens to the first lower eye wire member; and
securing means extending from one of the upper frame member and lower lens assembly;
wherein the other of the upper frame member and lower lens assembly has receiving means for receiving the securing means, with the securing means configured to engage the receiving means so as to releasably secure together the upper frame member and the lower lens assembly with the first lens seated therebetween, whereby the upper frame member may be detached by a user of the eyeglass assembly from the lower lens assembly.

12. An eyeglass assembly according to claim 11 wherein the lower lens assembly further includes a second lens, a second lower eye wire member and second attachment means for attaching the second lens to the second lower eye wire member.

13. An eyeglass assembly according to claim 11 wherein the lower lens assembly further includes a second lens, a second lower eye wire member, second attachment means for attaching the second lens to the second lower eye wire member, and a bridge member interconnecting first and second lower eye wire members.

14. An eyeglass assembly according to claim 11 wherein:
the securing means comprises latch means pivotally connected to said one of the upper frame member and the lower lens assembly; and
the receiving means comprises latch receiving means for receiving the latch means;
wherein the latch means is pivotally engagable with the latch receiving means for latching together the upper frame member with the lower lens assembly.

15. An eyeglass assembly according to claim 11 wherein:
the securing means comprises snap hook means; and
the receiving means comprises snap hook receiving means for receiving the snap hook means;
wherein the snap hook means is flexibly engagable with the snap hook receiving means for snapping together the upper frame member with the lower lens assembly.

16. An eyeglass assembly according to claim 11 wherein:
the securing means comprises flexible tab means; and
the receiving means comprises flexible tab receiving means for receiving the flexible tab means;
wherein the flexible tab means is flexibly engagable with the flexible tab receiving means for snapping together the upper frame member with the lower lens assembly.

17. An eyeglass frame according to claim 11 wherein the lower lens assembly includes at least one nose pad for resting the eyeglass frame on the nose of a wearer.

18. An eyeglass frame according to claim 11 wherein the upper frame member includes two nose pads for resting the eyeglass frame on the nose of a wearer.

19. An eyeglass upper frame member for receiving lens retaining assembly for seating and attaching thereto at least one lens having a periphery with upper and lower portions, the lens retaining assembly having flexible interframe securing means and a first lower eye wire member with lower seating means for seating the lower portion of the lens periphery, the eyeglass upper frame member comprising:
a brow member having opposing first and second ends and a first upper eye wire member located between the first and second ends, the first upper eye wire member having upper seating means for seating the upper portion of the lens periphery;
first and second elongated temple members each having a proximate end and a distal end terminating in an earpiece, the first temple member proximate end pivotally connected to the first end of the brow member and the second temple member proximate end pivotally connected to the second end of the brow member; and
receiving means for releasably receiving the interframe securing means of the lens retaining assembly with the lens seated between the upper and lower seating means, with the receiving means configured to flex the interframe securing means during engaging and disassembling of the eyeglass upper frame member and the lens retaining assembly, whereby the upper frame member may be detached by a user from the lens retaining assembly.

20. An eyeglass frame for seating first and second lenses each having a periphery with upper and lower portions, the eyeglass frame comprising:
an upper frame member having first upper seating means for seating the upper portion of the first lens periphery, and second upper seating means for seating the upper portion of the second lens periphery;
a lower frame assembly having first and second lower eye wire members, the first lower eye wire member having first lower seating means for seating the first lens and the second lower eye wire member having second lower seating means for seating the second lens, the lower frame assembly also having first attachment means for attaching the first lens to the first lower eye wire member, and second attachment means for attaching the second lens to the second lower eye wire member;

alignment means for aligning the upper frame member with the lower frame assembly;

latch means pivotally connected to one of the upper frame member and the lower frame assembly; and latch receiving means connected to the other of the upper frame member and the lower frame assembly for receiving the latch means;

wherein when the upper frame member is aligned with the lower frame assembly by the alignment means, the latch means is pivotally engagable with the latch receiving means for releasably latching together the upper frame member with the lower frame assembly, whereby both the first and second lens may be retained between the upper frame member and the lower frame assembly with the first lens seated in the first upper and lower seating means, and the second lens seated in the second upper and lower seating means.

21. A method of interchanging separable interchangeable eyeglass frames, comprising the steps of:
providing an eyeglass assembly including:
a lower lens assembly comprising interframe securing means and first and second lenses, each lens having a periphery with upper and lower portions, the lower lens assembly including first and second lower eye wire members, the first lower eye wire member having first lower seating means for seating the first lens lower periphery portion and the second lower eye wire member having second lower seating means for seating the second lens lower periphery portion, the lower lens assembly also having first and second attachment means, the first attachment means for attaching the first lens to the first lower eye wire member and the second attachment means for attaching the second lens to the second lower eye wire member; and
a first upper frame member and a replacement upper frame member, each upper frame member comprising first upper seating means for seating the upper portion of the first lens periphery, and second upper seating means for seating the upper portion of the second lens periphery, each upper frame member also including receiving means for releasably receiving the interframe securing means of the lower lens assembly;
aligning the first upper frame member with the lower lens assembly;
engaging the interframe securing means with the receiving means of the first upper frame member to form a first eyeglass assembly;
disassembling the first eyeglass assembly by disengaging the interframe securing means with the receiving means of the first upper frame member;
aligning the replacement upper frame member with the lower lens assembly; and
engaging the interframe securing means with the receiving means of the replacement upper frame member to form a second eyeglass assembly.

22. A method of interchanging separable interchangeable eyeglass frames, comprising the steps of:
providing an eyeglass assembly including:
a lower lens assembly comprising interframe securing means and first and second lenses, each lens having a periphery with upper and lower portions, the lower lens assembly including first and second lower eye wire members, the first lower eye wire member having first lower seating means for seating the first lens lower periphery portion and the second lower eye wire member having second lower seating means for seating the second lens lower periphery portion, the lower lens assembly also having first and second attachment means, the first attachment means for attaching the first lens to the first lower eye wire member and the second attachment means for attaching the second lens to the second lower eye wire member; and
a first upper frame member and a replacement upper frame member, each upper frame member comprising first upper seating means for seating the upper portion of the first lens periphery, and second upper seating means for seating the upper portion of the second lens periphery, each upper frame member also including receiving means for releasably receiving the interframe securing means of the lower lens assembly;
aligning the first upper frame member with the lower lens assembly;
engaging the interframe securing means with the receiving means of the first upper frame member by pushing together the first upper frame member and the lower lens assembly into engagement to form a first eyeglass assembly;
disassembling the first eyeglass assembly by releasing the engagement of the interframe securing means with the receiving means of the first upper frame member and pulling apart the first upper frame member and the lower lens assembly;
aligning the replacement upper frame member with the lower lens assembly; and
engaging the interframe securing means with the receiving means of the replacement upper frame member by pushing together the replacement upper frame member and the lower lens assembly into engagement to form a second eyeglass assembly.

* * * * *

UNITED STATES PATENT AND TRADEMARK OFFICE
CERTIFICATE OF CORRECTION

PATENT NO. : 5,098,180

DATED      : March 24, 1992

INVENTOR(S): Michael D. Tobey

It is certified that error appears in the above-identified patent and that said Letters Patent is hereby corrected as shown below:

Column 9, line 22, "flexible" should be --flexibly--.

Signed and Sealed this

Twenty-first Day of September, 1993

Attest:

BRUCE LEHMAN

Attesting Officer

Commissioner of Patents and Trademarks